(12) United States Patent
Matthes et al.

(10) Patent No.: US 6,427,045 B1
(45) Date of Patent: Jul. 30, 2002

(54) SPLICE TRAY FOR USE IN SPLICING FIBER OPTIC CABLES AND HOUSING THEREFOR

(75) Inventors: John Matthes, Southlake; Georgeanne M. Radloff, Grand Prairie; Mark Hendrix, Richardson; Ram Ramachandran, Arlington; George Bu-Abbud, Southlake, all of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/520,587

(22) Filed: Mar. 8, 2000

(51) Int. Cl.[7] .................................................. G02B 6/00
(52) U.S. Cl. .......................... 385/135; 385/93; 385/134; 385/136; 385/137
(58) Field of Search ................................ 385/134, 135, 385/136, 137, 138, 95, 99

(56) References Cited

U.S. PATENT DOCUMENTS

| | | | |
|---|---|---|---|
| 4,861,134 A | * 8/1989 | Alameel et al. | 385/135 X |
| 5,212,761 A | * 5/1993 | Petrunia | 385/135 |
| 5,241,617 A | * 8/1993 | Peacock et al. | 385/135 |
| 5,689,606 A | * 11/1997 | Hassan | 385/135 |
| 5,802,237 A | * 9/1998 | Pulido | 385/135 |
| 5,892,877 A | * 4/1999 | Meyerhoefer | 385/136 |

* cited by examiner

Primary Examiner—Brian Healy

(57) ABSTRACT

A splice tray for use in splicing fiber optic cables has an outer periphery and a cable splicing area inwardly of the outer periphery. A main cable guideway for receiving a pair of side-by-side cables to be spliced extends along a portion of the outer periphery adjacent thereto. The main cable guideway splits into first and second continuation guideways, the first of which curves inwardly from the outer periphery to intersection with the splicing area from one direction. The second continuation guideway continues along another portion of the outer periphery to intersection with the splicing area from another direction. The two fiber optic cables that extend along the main guideway are separated to extend through the first and second continuation guideways to the splicing area for being joined together in a splice. A cable looping device is provided in the splicing area for receiving cable loops to take up slack, and a splice receiving recess is provided in the splice area for holding a splice. A housing for the splice tray includes a vertical case having a door hinged to the bottom portion thereof for swinging movement about a horizontal hinge axis between a vertical closed position and a horizontal open position. The splice tray is attached to the inside of the door for receiving a pair of cables that extend from the case and across the hinge to the splice tray. An integral inclined guideway extension on the splice tray extends toward the hinge axis along an inclined door bottom wall for receiving the cables.

21 Claims, 12 Drawing Sheets

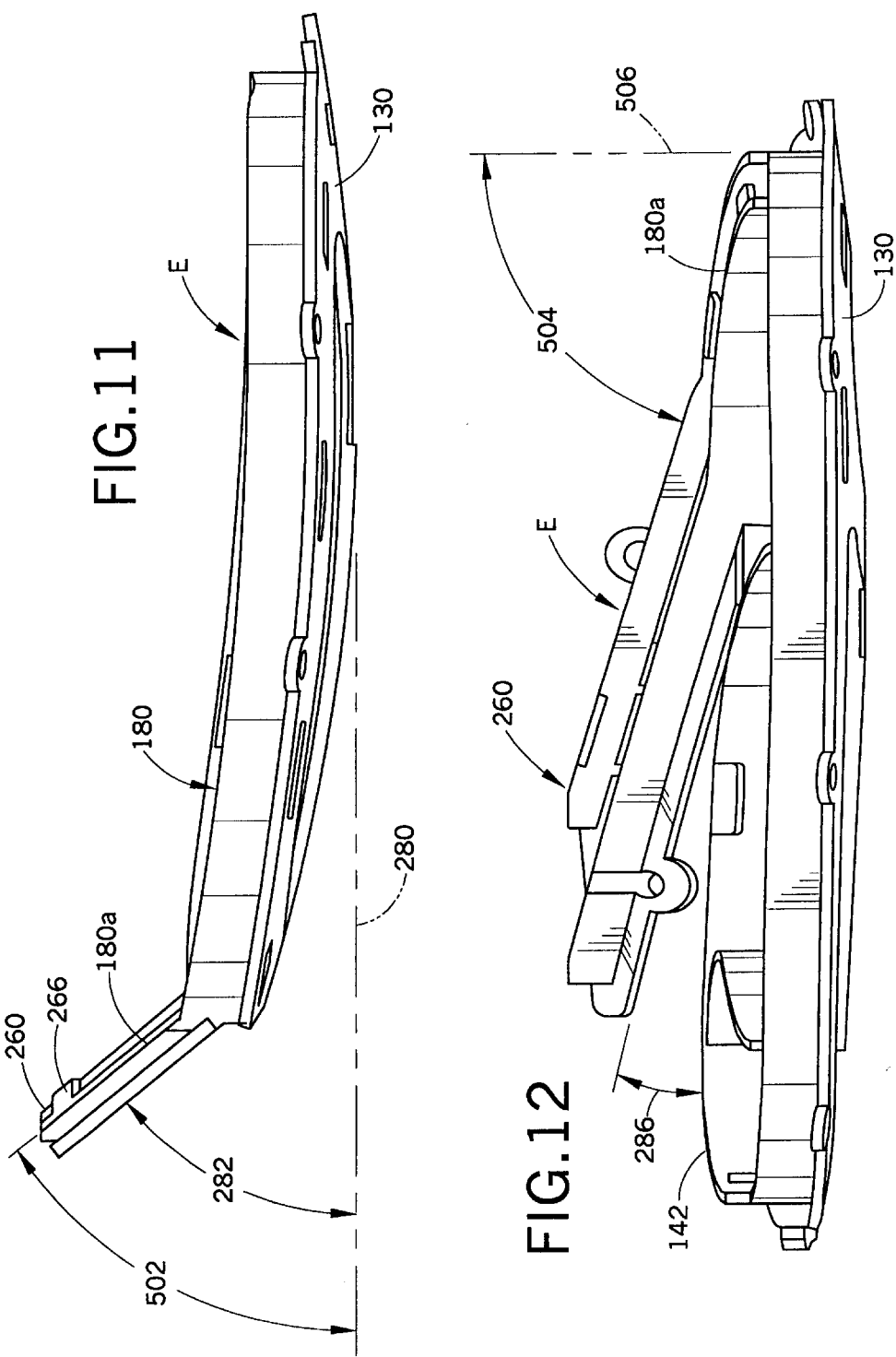

SPLICE TRAY FOR USE IN SPLICING FIBER OPTIC CABLES AND HOUSING THEREFOR

BACKGROUND OF THE INVENTION

This application relates to the art of fiber optic cable management and, more particularly, to a splice tray and a splice tray housing that have features for managing fiber optic cables. The invention is particularly applicable for use in providing communications services to individual customers and will be described with specific reference thereto. However, it will be appreciated that the invention has broader aspects and can be used for other purposes.

A home network unit is a housing that contains electronics, cables and connectors for use in providing a customer with communications services including telephone, television and data. Fiber optic cables within the unit must be managed and protected in order to preserve the integrity of the services. It would be desirable to have an efficient and practical way to manage and protect the fiber optic cables within the home network unit.

SUMMARY OF THE INVENTION

A fiber optic cable management system includes a housing having an outwardly open vertical case with a door hinged to the bottom portion thereof for swinging movement about a horizontal hinge axis between vertical closed and horizontal open positions.

A splice tray attached to the inside of the door provides a convenient work service when the door is in its horizontal open position. The splice tray includes an outer periphery and has a splicing area inwardly of the outer periphery.

A main guideway for fiber optic cables extends along a portion of the splice tray outer periphery for receiving a pair of fiber optic cables that extend from the case to the door across the hinge. The main guideway divides into a pair of first and second continuation guideways, the first of which curves inwardly of the outer periphery to enter the splicing area from one direction. The second continuation guideway continues along the outer periphery of the splice tray and enters the splicing area from another direction. The two fiber optic cables that extend along the main guideway are separated so that one cable extends along each of the first and second continuation guideways. The splicing area is used to splice the ends of the two fiber optic cables, and a splice receiving recess is provided in the splicing area for retaining a completed splice.

In a preferred arrangement, the splicing area includes a cable looping device similar to a spool for receiving loops of the fiber optic cables to take up slack.

A cover hinged to the splice tray adjacent the outer periphery thereof is provided for closing the splicing area to protect the splice and the cables, and to maintain same within the splicing area.

A main guideway extension extends outwardly and upwardly from the splice tray toward the horizontal hinge axis across an inclined door bottom wall. The fiber optic cables extend across the hinge at an angle of around 20–40° to facilitate the transition of the cables from the case to the door.

It is a principal object of the present invention to provide an improved splice tray for use in splicing and managing fiber optic cables.

It is an other object of the invention to provide an improved communications housing in which a splice tray is positioned for use in splicing and managing fiber optic cables.

It is an additional object of the invention to provide a splice tray having an inclined guideway extension for guiding fiber optic cables across a hinge between a housing case and door.

BRIEF DESCRIPTION OF THE DRAWING

FIG. 11 is an end elevational view taken generally on line 10–10 of FIG. 6, and showing the inclination of a main guideway extension outwardly and upwardly from the spice tray base;

FIG. 12 is a side elevational view taken generally on line 11—11 of FIG. 6 and showing the sideways inclination of the main guideway extension;

DESCRIPTION OF A PREFERRED EMBODIMENT

Figure 1:
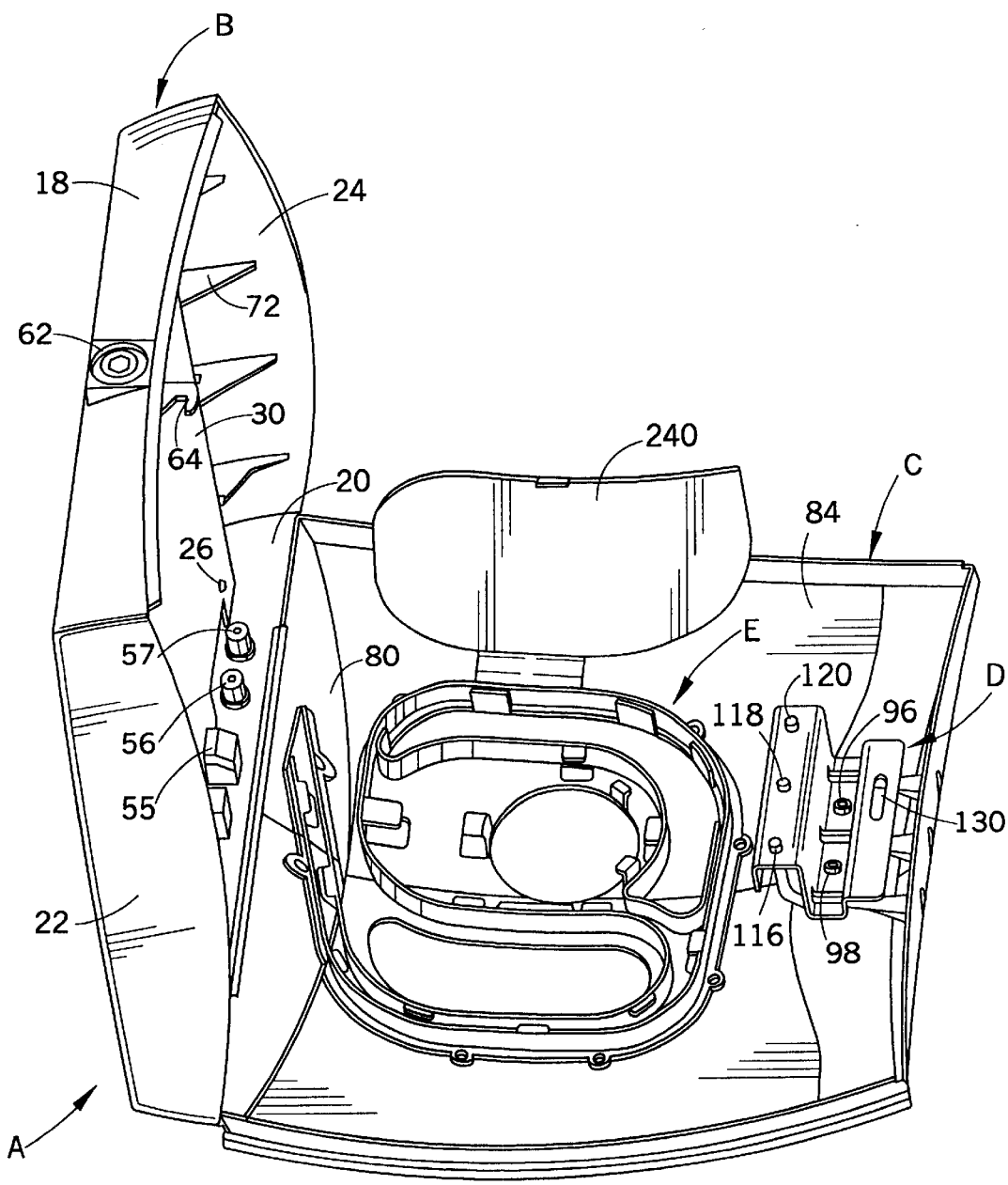
FIG. 1 is a perspective illustration of a splice tray and housing in accordance with the present application.
Figure 4:
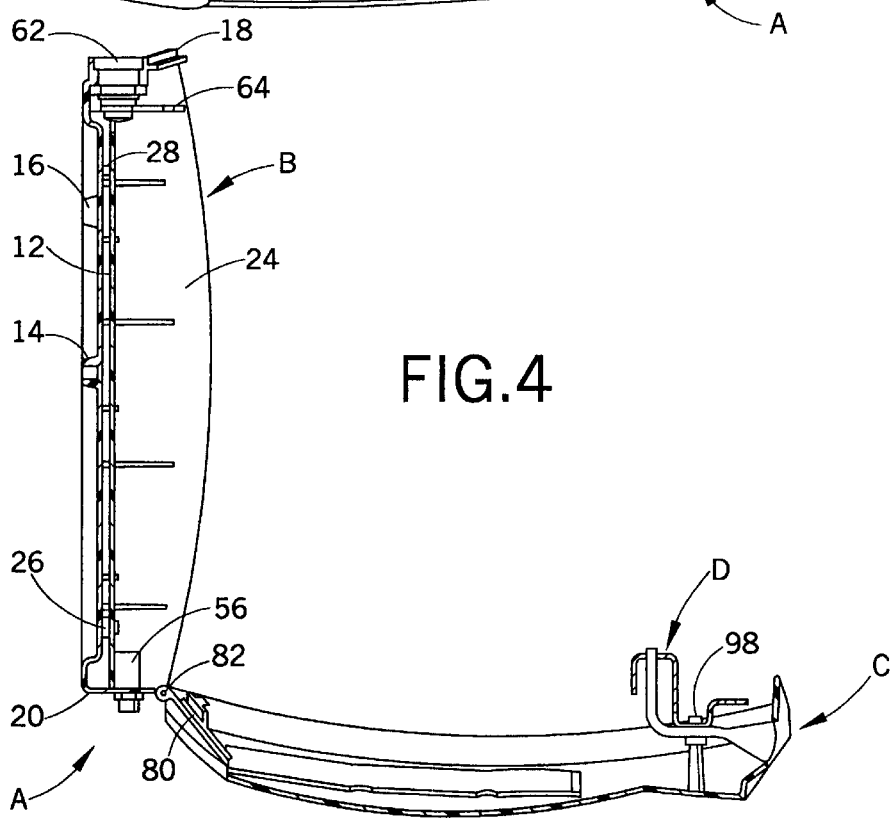
FIG. 4 is a cross-sectional elevational view taken generally on line 4—4 of FIG. 3.

Referring now to the drawing, wherein the showings are for purposes of illustrating a preferred embodiment of the invention only and not for purposes of limiting same, FIG. 1 shows a housing A that includes a case B and a door C. Case B may take many forms and in the arrangement shown has the configuration of a generally rectangular box. With reference to FIG. 4, backwall 12 of case B has a plurality of bosses with fastener receiving holes therethrough for attaching case B to a plane vertical service such as a wall. Only two of the fastener receiving bosses are shown at 14 and 16 on backwall 12 in FIG. 4.

Figure 7:
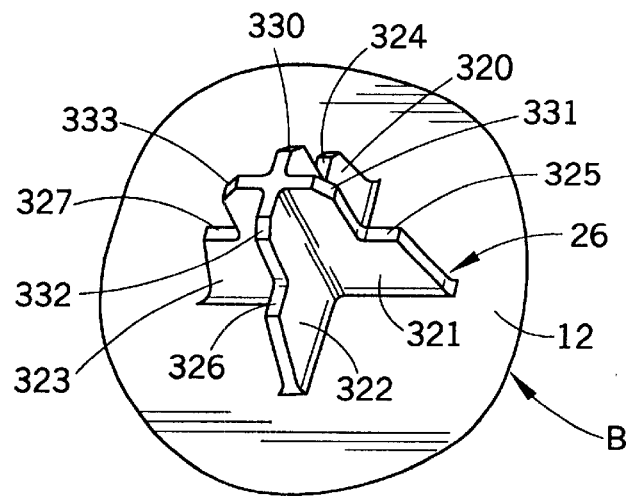
FIG. 7 is a perspective illustration of a cruciform boss that extends upwardly from the inner surface of the housing door for use in securing a splice tray thereto, or that extends inwardly from the case backwall for use in securing a printed circuit board thereto.
Figure 8:
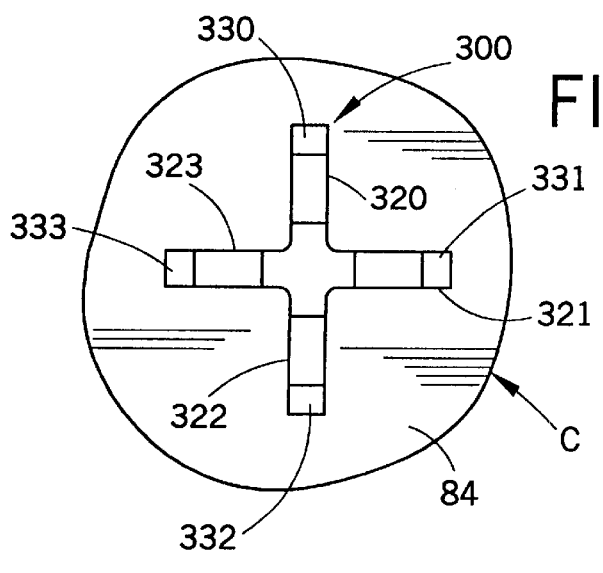
FIG. 8 is a top plan view of a boss upstanding from the inside surface of the case backwall for use in securing a printed circuit board thereto.
Figure 9:
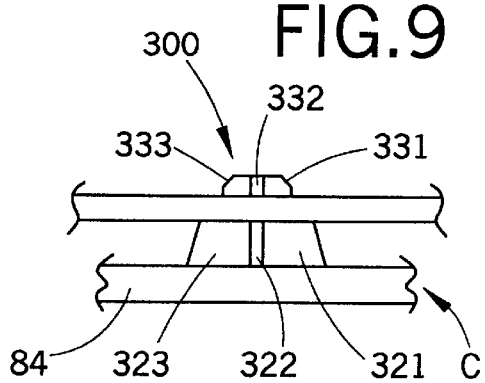
FIG. 9 is a partial side elevational view of the boss of FIG. 7.

With case B mounted vertically as described, it has an open front that opens horizontally outwardly, and a case periphery that is formed by top and bottom walls 18, 20 and opposite sidewalls 22, 24. Case backwall 12 has a plurality of inwardly projecting cruciform bosses, only two of which are illustrated in FIG. 4 at 26 and 28, for attaching a printed circuit board thereto as will be described hereafter with reference to FIGS. 7–9.

Figure 2:
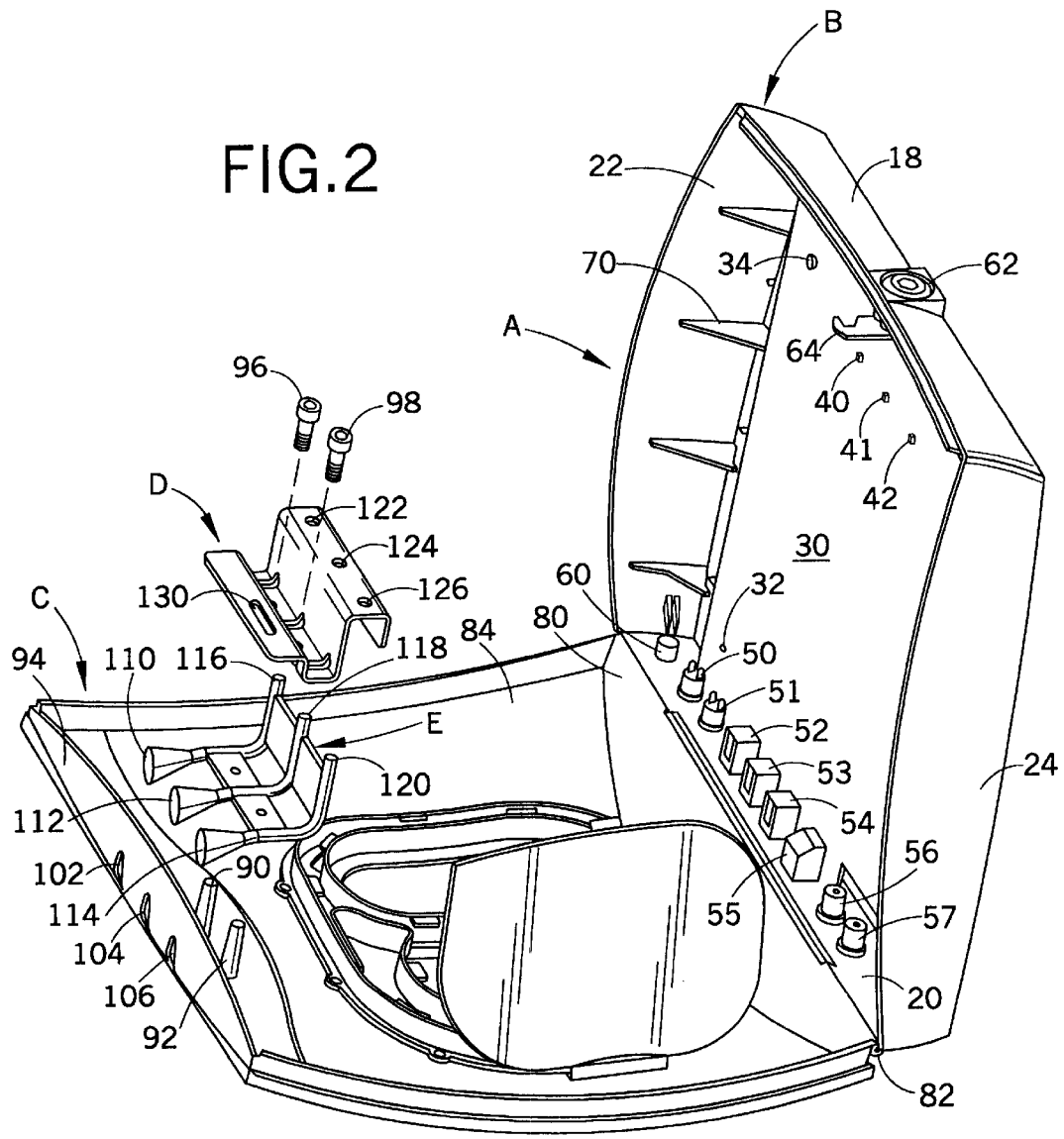
FIG. 2 is another perspective illustration of the splice tray and housing.
Figure 3:
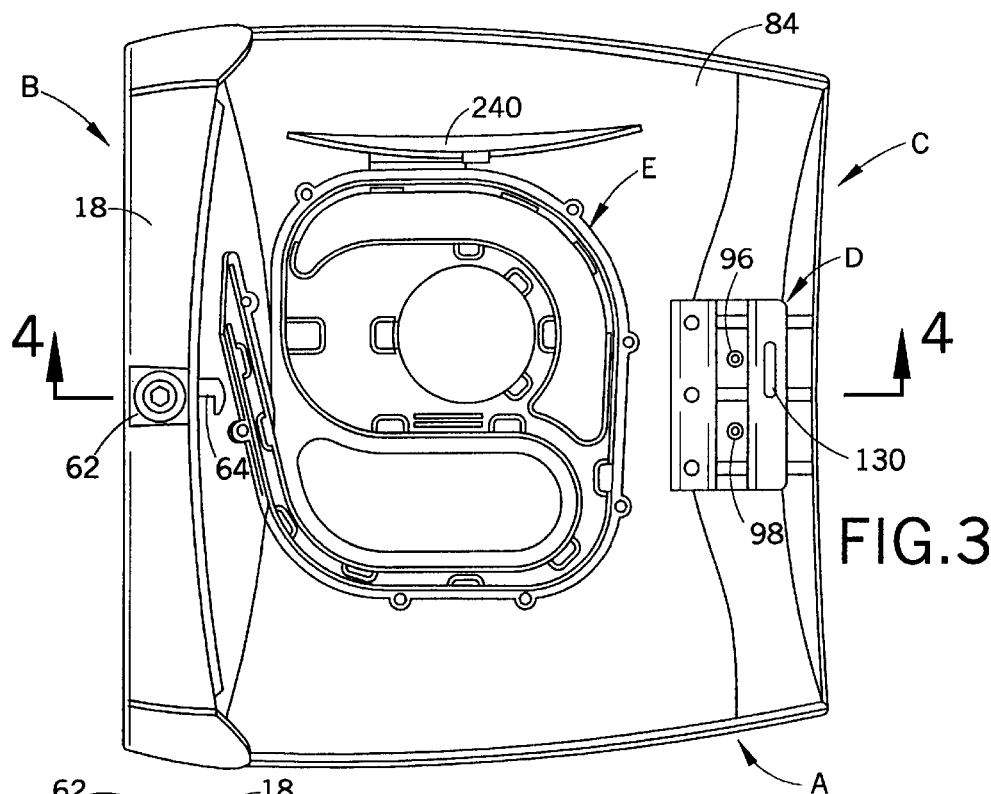
FIG. 3 is a top plan view of the housing with a hinged door in an open generally horizontal position.

A generally rectangular printed circuit board 30 is received within case B and has suitable holes therethrough adjacent the four corners thereof for receiving the cruciform bosses that extend inwardly from the case backwall with an interference fit. The ends of other two cruciform bosses 32, 34 are shown extending through the holes in printed circuit board 30 in FIG. 2. Printed circuit board 30 has light-emitting diodes 40, 41 and 42 thereon as illustrated in FIG. 2 for a purpose to be described hereafter.

Bottom wall 20 of case B has a plurality of connectors mounted thereon for making connections to various communications devices in the building, such as a residence, to which case B is attached. The connectors are generally indicated by numbers 50–57 in FIG. 2. A grommet 60 is provided in case bottom wall 20 adjacent case sidewall 22 for receiving a fiber optic supply cable that enters case B from the outside through grommet 60.

A suitable latch assembly 62 on case top wall 18 includes a latch member 64 that cooperates with a latch keeper on door C as described hereafter. A plurality of spaced-apart stiffening ribs and fiber optic cable guide members are provided on case sidewalls 22, 24, and only one such rib on each sidewall is identified by numeral 70 for case sidewall 22 and 72 for case sidewall 24.

Door C has a door bottom wall 80 that is hingedly connected with case bottom wall 20 by a horizontal hinge pin 82 for swinging movement of door C about a horizontal hinge axis between a vertically closed position and generally horizontal open position. Door C is configured and shaped to cooperate with case B in the vertical door closed position for completely closing the outwardly facing opening in case B. Door C has an outwardly curved door front wall 84 that is so shaped primarily for aesthetic purposes. Thus, in the generally horizontal open position of door C, the inner surface of door front wall 84 is concave or dished.

Figure 5:
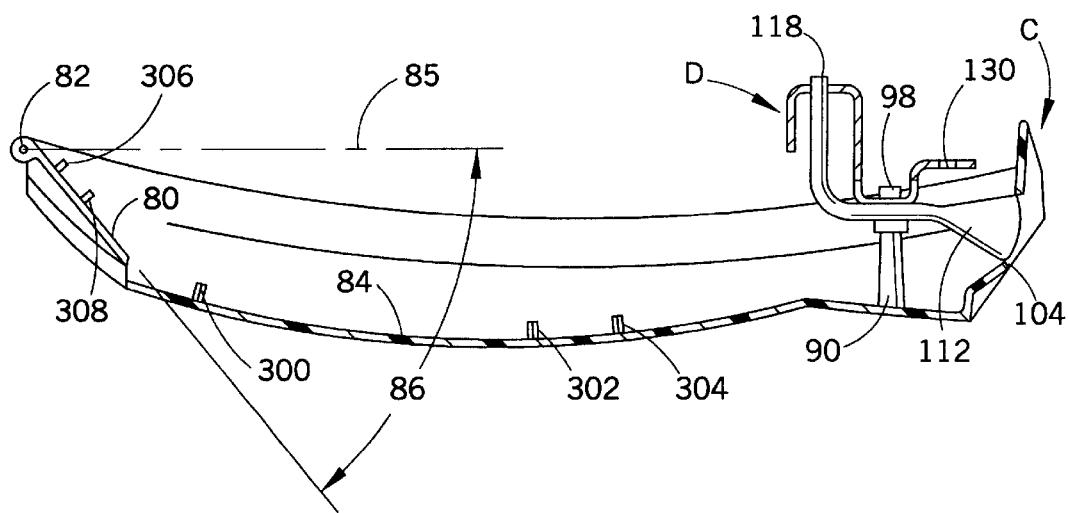
FIG. 5 is a partial cross-sectional elevational view of the housing door in its generally horizontal position and showing an inclined door bottom wall along with upstanding bosses within the door for use in securing a splice tray thereto.

As shown in FIG. 5, door bottom wall 80 is inclined downwardly from the horizontal 85 at an angle 86 between 40–60° in the generally horizontal open position of door C. In one arrangement, the downward inclination has been made at approximately 50° to the horizontal. Door C travels through an arc of approximately 95° from its vertical closed position to its generally horizontal open position. Thus, the door is inclined downwardly approximately 5° from hinge axis 82 toward the front of the door.

A pair of bored bosses 90, 92 extend upwardly from the interior surface of door front wall 84 adjacent door top wall 94. Fasteners 96, 98 extend through suitable holes in a latch keeper D and in a light pipe assembly E into the bores in bosses 90, 92 for securing the latch keeper and the light pipe assembly within the door.

Door top wall 94 has openings 102, 104 and 106 therein through which outwardly flared end portions 110, 112 and 114 of light pipes are visible. Opposite ends 116, 118 and 120 of the light pipes extend through holes 122, 124 and 126 in latch keeper D and are aligned with light-emitting diodes 40, 41 and 42 when door C is in its vertical closed position. Light that is emitted by the light-emitting diodes is transmitted through the light pipes for viewing through openings 102, 104 and 106 in the closed position of the door so that a person may inspect the status of the electronics in the home network unit. A slot 130 in latch keeper D receives latch member 64 on case B for releasably holding door C in its vertical closed position.

Figure 6:
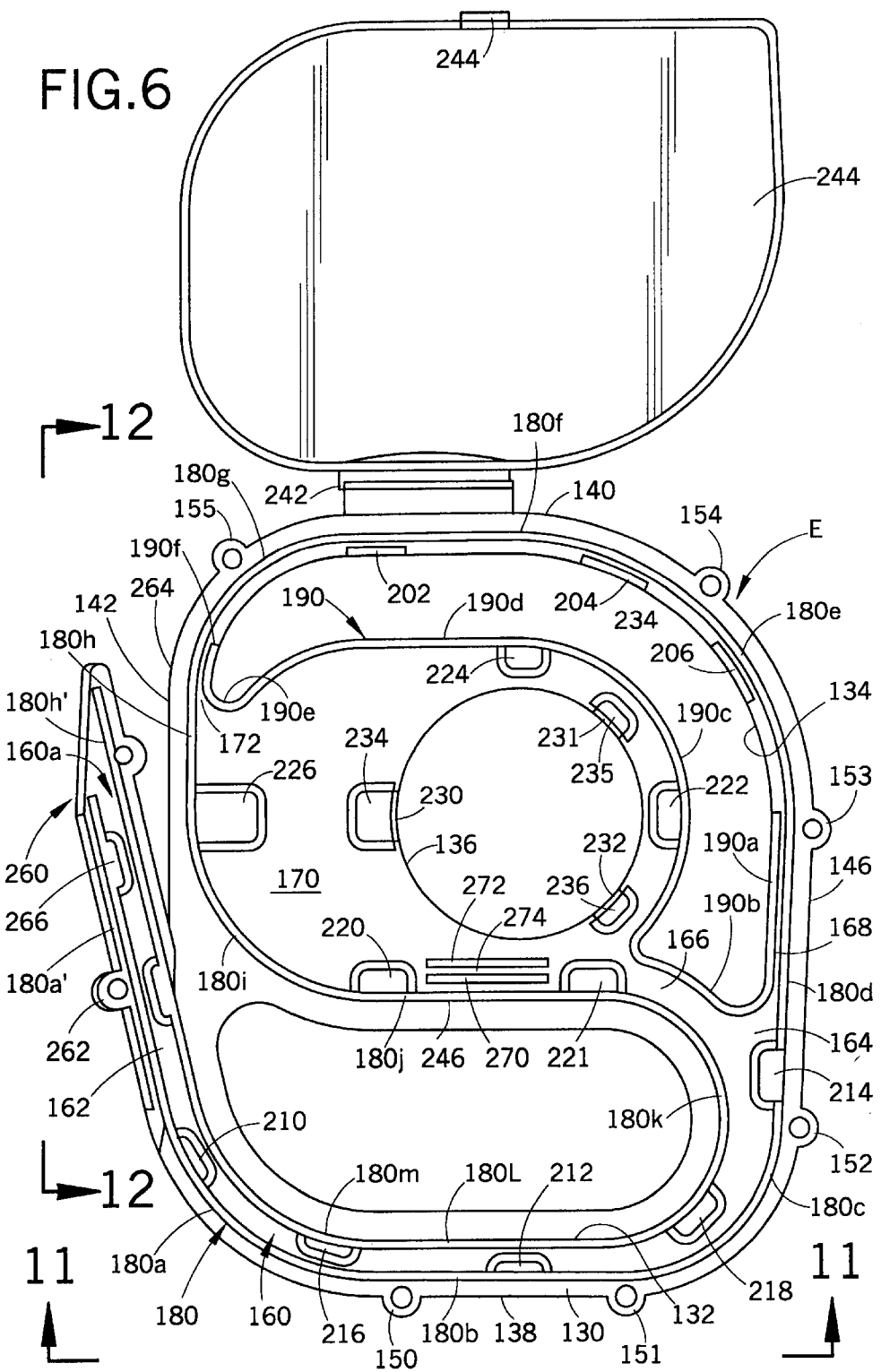
FIG. 6 is a top plan view of a splice tray constructed in accordance with the present application.

A plastic molded one-piece fiber optic cable splice tray E is attached within door C to the inside surface of door wall 84 for managing and splicing fiber optic cables. With reference to FIG. 6, splice tray E has a thin base 130 with openings 132, 134 and 136 therethrough that facilitate molding and conservation of material. It will be recognized that the periphery of tray E may have many different shapes, and that the peripheral shape described and shown herein is simply by way of illustration. Splice tray E has a generally rectangular configuration so that its outer periphery has opposite ends 138, 140 and opposite sides 142, 146. Obviously, the peripheral shape also could be generally circular, generally oval or many other shapes. A plurality of tabs 150–155 extend outwardly from tray base 130 and have circular holes therethrough for receiving cruciform bosses upstanding from door front wall 84 to secure the tray within door C. The tabs and holes are located in spaced-apart relationship around the periphery of tray E.

A curved main guideway 160 has an entrance end portion 162 adjacent tray side 142 and a forked end portion 164 adjacent tray side 146. Thus, main guideway 160 extends in a curved path from side 142 to side 146 adjacent to and along tray end 138. At forked end portion 164, main guideway 160 separates into a pair of first and second secondary or continuation guideways 166, 168. First continuation guideway 166 intersects an inward area of tray E around circular opening 136 that is located inwardly of the outer periphery of the tray to provide a cable splicing and slack management area generally indicated by numeral 170.

Second continuation guideway 168 continues along side 146 and along end 140 to extend back in an opposite direction part way along opposite side 142 to enter splicing area 170 at an entrance opening 172 from a different direction than first continuation guideway 166. Although the first and second continuation guideways enter splicing area 170 generally opposite from one another, it will be recognized that they could enter the splicing area from other different directions.

The fiber optic cable guideways are defined between spaced-apart outer and inner guideway walls that extend upwardly from tray base 130. Main guideway outer wall 180 has a curved portion 180a that extends from main guideway entrance end 162 to a straight outer wall portion 180b that extends along tray end 138 and merges with a curved portion 180c that in turn merges with a straight portion 180d extending along tray side 146. Outer wall portion 180d then becomes the outer wall for second continuation guideway 168 and curves as indicated at 180e over to a straight portion 180f extending along tray end 140. The outer guideway wall then curves as indicated at 180g to merge with a straight portion 180h extending part way along tray side 142. The outer wall then curves inwardly as indicated at 180i to extend in a crossing portion 180j back across tray E toward opposite sidewall 146. The outer wall then has a reversely curved portion 180k that curves 180° to define an inner guideway wall for the main guideway. Curved portion 180k merges with a straight portion 180l that extends along tray end 138 in inwardly-spaced relationship to outer wall portion 180b. The inner wall then curves as indicated at 180m to the guideway entrance end 162. Thus, one serpentine wall curves around and across the tray to form both the inner and outer walls for the main guideway 160.

Wall portions 180h, 180i and 180j partly surround splicing area 170, and the remainder of splicing area 170 is bordered by a border wall 190 that extends upwardly from tray base 130. Border wall 190 includes a portion 190a that extends partly along second continuation guideway 168 from forked end portion 164 of the main guideway. The border wall then curves inwardly toward the splicing area in a border wall portion 190b that forms the opposite guideway wall of first continuation guideway 166. The border wall then has a curved portion 190c curving around splicing area 170 to merge with a straight portion 190d that extends along tray end 140 spaced inwardly therefrom. The border wall is then reversely curved as indicated at 190e and has a terminal portion 190f opposite from outer curved wall portion 180g.

Inner guideway wall segments 202, 204 and 206 are spaced inwardly from outer guideway wall portions 180f and 180e to form channels therebetween for receiving a fiber optic cable. Inner guideway wall segments 202, 204 and 206 are spaced-apart from one another and from other adjacent guideway inner walls to provide spaces at the opposite ends of each inner wall segment along the guideway for accommodating a person's fingers. Thus, a person may lay a fiber optic cable along the top openings of the channels between the inner wall segments and the outer guideway wall followed by pressing on the cable at the opposite ends of each channel to force the fiber optic cable into each channel with a tight fit. This retains and strain relieves the incoming fiber optic cable within the second continuation guideway 168. The width of each channel preferably is smaller than the diameter of the portion of the fiber optic cable that is received therein so that the cable is resiliently gripped or squeezed between the channel walls.

Tabs 210, 212 and 214 extend inwardly from outer guideway wall 180 spaced above the bottom wall of main guideway 160 to retain cables within the guideway. Additional tabs 216 and 218 extend inwardly from the inner guideway wall in overlying spaced relationship to the guideway bottom wall. Additional tabs provided for the same purpose extend into splicing area 170 in upwardly spaced relationship to the bottom wall thereof as indicated at 220 and 221 on wall portion 180j, at 222 on border wall portion 190c, and at 224 on border wall portion 190d. Another tab 226 extends inwardly of splicing area 170 from wall portion 180h. Tabs on the outer cable guideway walls are staggered relative to the tabs on the inner cable guideway walls.

Three circumferentially-spaced arcuate arms 230, 231 and 232 extend upwardly from splicing area 170 around circular opening 136 therein. Each arm has an outwardly extending tab 234, 235 and 236 thereon to form a spool-like looping device around which fiber optic cables may be looped within splicing area 170 to take up slack. The arcuate vertical outer surfaces of arms 230, 231 and 232 preferably lie on the periphery of a common cylinder.

Figure 10:
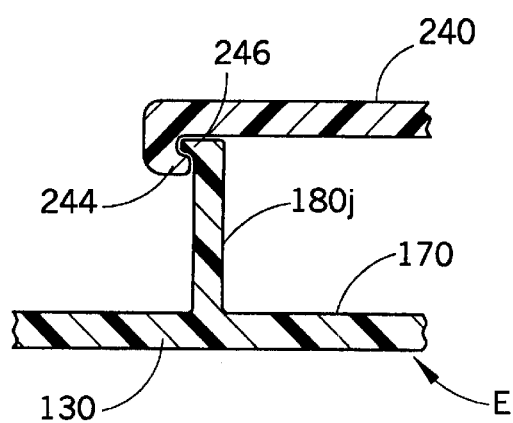
FIG. 10 is a partial cross-sectional elevational view showing a latching arrangement between a splice tray cover and an upstanding wall on the base of the splice tray.

A splice tray cover 240 is hinged to the outer periphery of tray E along end wall 140 by a molded living hinge 242 for movement between the open position shown in FIG. 6 and a closed position covering splicing area 170. As shown in FIG. 10, cover 240 has a latch member 244 thereon for cooperation with a latch keeper 246 that is provided on the opposite side of guideway wall portion 180j from splicing area 170. As shown in FIG. 10, latch member 244 on cover 240 snaps over latch keeper projection 246 to releasably retain cover 240 in a closed position over the splicing area.

Splice tray E has an extension 260 projecting therefrom to provide a main guideway extension 160a that forms a continuation of main guideway 160. Guideway extension 260 has an outer wall 180a' that is an extension of guideway outer wall 180a. The extension guideway has an opposite inner wall 180m' that is a continuation of inner main guideway 180m. Main guideway extension 260 has securing tabs 262 and 264 extending outwardly therefrom with holes therethrough for receiving bosses that project from the inner surface of door bottom wall 80. Staggered cable retaining tabs 266 and 268 extend inwardly from extension guideway walls 180a' and 180m' in spaced relationship to the bottom wall of extension main guideway 160a. All of the cable retaining tabs that overlie the cable guideways preferably extend between ¼ to ½ of the way across the guideway.

A pair of elongated thin ribs or thin walls 270, 272 extend upwardly from tray base 130 in spaced-apart side-by-side relationship within splicing area 170 adjacent wall 180j to provide a splice receiving recess 274 therebetween. Thus, a splice that is made in fiber optic cables within splicing area 170 may be positioned and retained within recess 274.

With reference to FIG. 11, main guideway extension 260 is inclined upwardly from the horizontal 280 at an angle 282 that is the complement of angle 86 in FIG. 5 for the downward slope of door bottom wall 80. Thus, main guideway extension 260 is inclined so that it extends generally parallel to the surface of door bottom wall 80 toward the horizontal hinge axis. As shown in FIG. 12, main guideway extension 260 is inclined at an angle 286 to tray side 142 that is between 20–40°. In one arrangement, angle 286 has been made approximately 25–30° so that fiber optic cables extend across hinge 82 between case B and door C at an angle of approximately 25–30° to the horizontal hinge axis.

With reference to FIG. 5, a plurality of cruciform bosses 300, 302 and 304 are shown extending upwardly from the inner surface of door front wall 84. A pair of bosses 306 and 308 are also shown extending outwardly from door bottom wall 80 perpendicular thereto. The bosses that extend upwardly from the inner surface of door front wall 84 are equal in number and spacing to the holes in tabs 150–155 that extend outwardly from the outer periphery of splice tray E. Likewise, bosses 306 and 308 on door bottom wall 80 are spaced for reception through the holes in tabs 262 and 264 on guideway extension 260.

The cruciform bosses that are used to secure the splice tray to the door have the same configuration as the cruciform bosses that are used to secure the printed circuit board to the backwall of the case. Therefore, only one boss 26 will be described with reference to FIGS. 7–9. The boss has a generally cruciform cross-sectional configuration formed by four walls 320–323 extending outwardly from a common center and spaced 90° apart. Each wall is stepped inwardly around midway of its length to provide support shoulders 324–327. Each wall has an inwardly sloping upper cam surface 330–333 to facilitate insertion of the cruciform bosses within the holes in the printed circuit board 30 or in the holes in the tabs on tray E. The size of the circular holes in the tray tabs and the printed circuit board relative to the size of the cruciform bosses is such that there is an interference fit and the bosses must be forced through the holes until the tray tabs or the printed circuit board rest against the support shoulder surfaces on the bosses to secure the board or tray in position.

Figure 14:
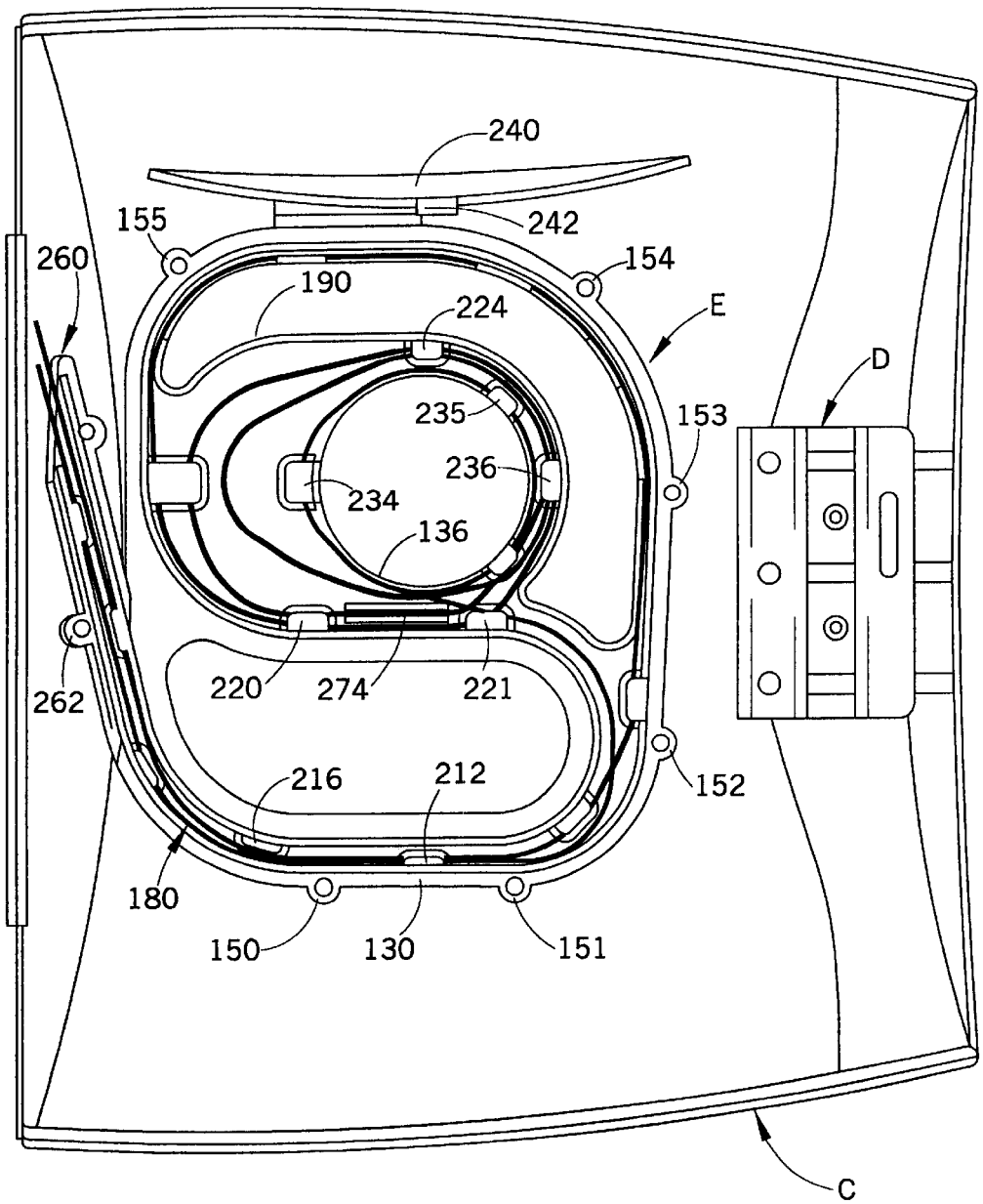
FIG. 14 is a top plan view looking down on the door in its horizontal open position and illustrating fiber optic cables extending through guideways in the splice tray into the splicing area.
Figure 15:
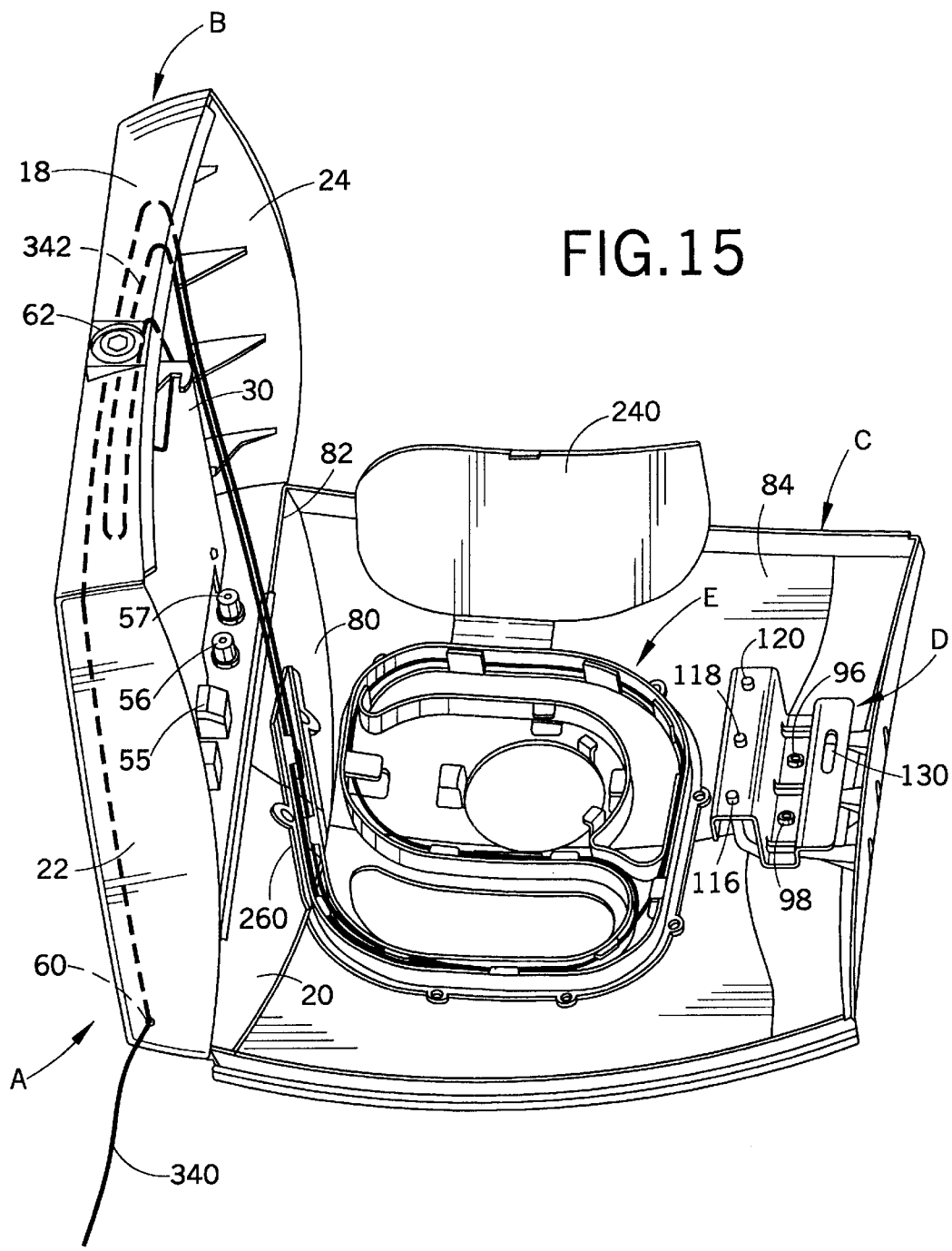
FIG. 15 is a perspective illustration showing fiber optic cables extending around the housing case and across a hinge into guideways in a splice tray attached to the housing cover.

FIGS. 14 and 15 are illustrative examples of how fiber optic cables are maintained by the improved housing and splice tray of the present application. FIG. 15 shows a main fiber optic supply cable 340 entering case B through grommet 60 in case bottom wall 20. Main fiber optic cable 340 is very heavy and stiff, and is extended around the inner periphery of case B outwardly of printed circuit board 30. Another fiber optic cable that is attached to printed circuit board 30, such as a 900 μm fiber optic cable 342, also extends part way around the inner periphery of case B alongside main cable 340.

Figure 13:
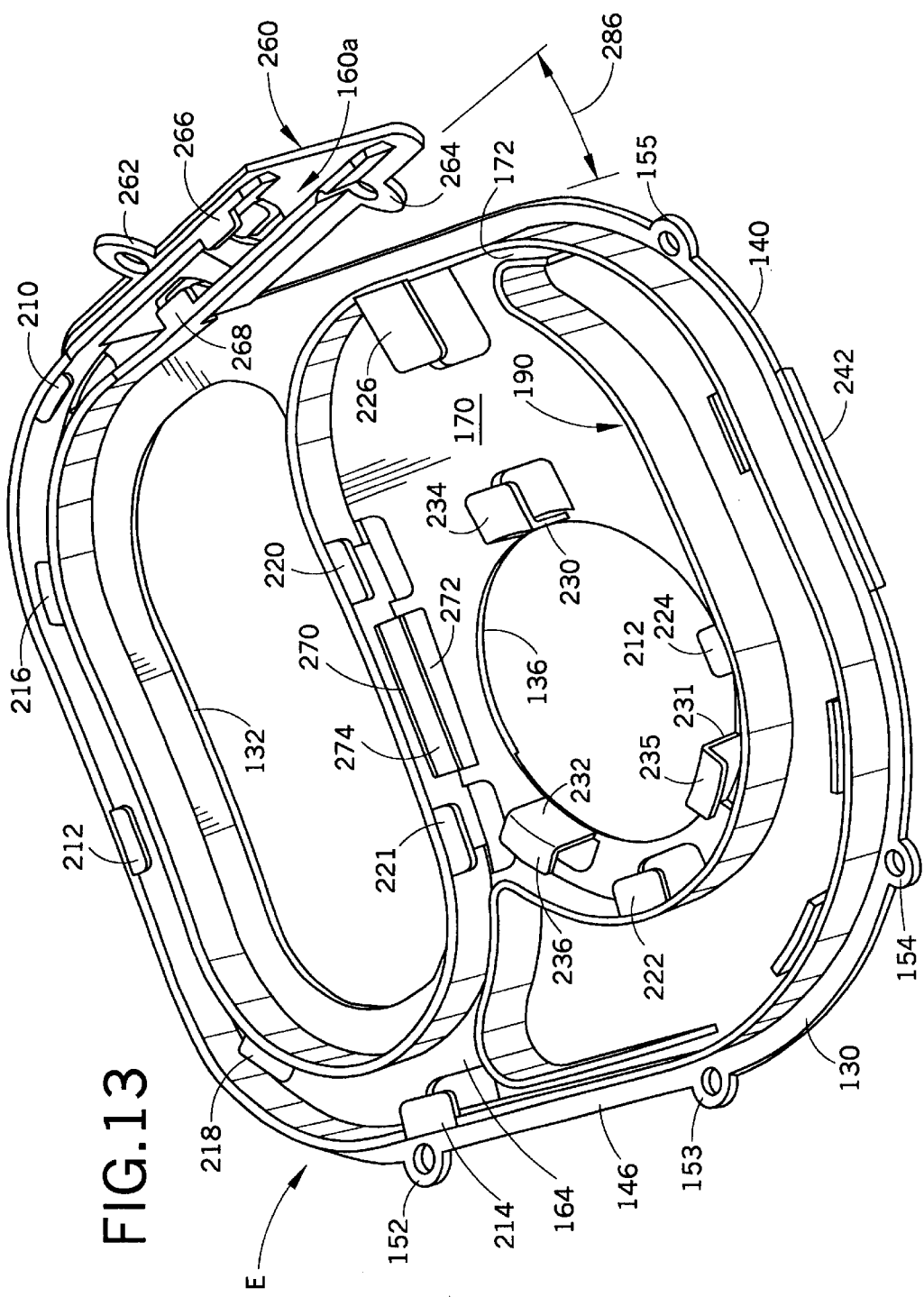
FIG. 13 is a perspective illustration of the splice tray with the cover for the splicing area omitted.

The two cables 340, 342 extend across hinge 82 at an angle of approximately 30° and enter the guideway in guideway extension 260. The two cables are then guided along the main guideway until they are separated at the forked end portion of the main guideway to continue separately through the first and second continuation guideways. The outer insulation is stripped from the cables so that the main cable is no longer as stiff and is easier to work with. The ends of the two fiber optic cables 340 and 342 are then spliced together within splicing area 170 which provides a very convenient generally horizontal working area for an installer. One or more loops or turns may be formed in one or both of the fiber optic cables around the spool arms in the splicing area to take up slack as indicated in FIG. 13. The splice that is made is then positioned in recess 274 for retention therein followed by closing of splice tray door 240. FIG. 14 shows the same type of arrangement in a plan view.

Figure 16:
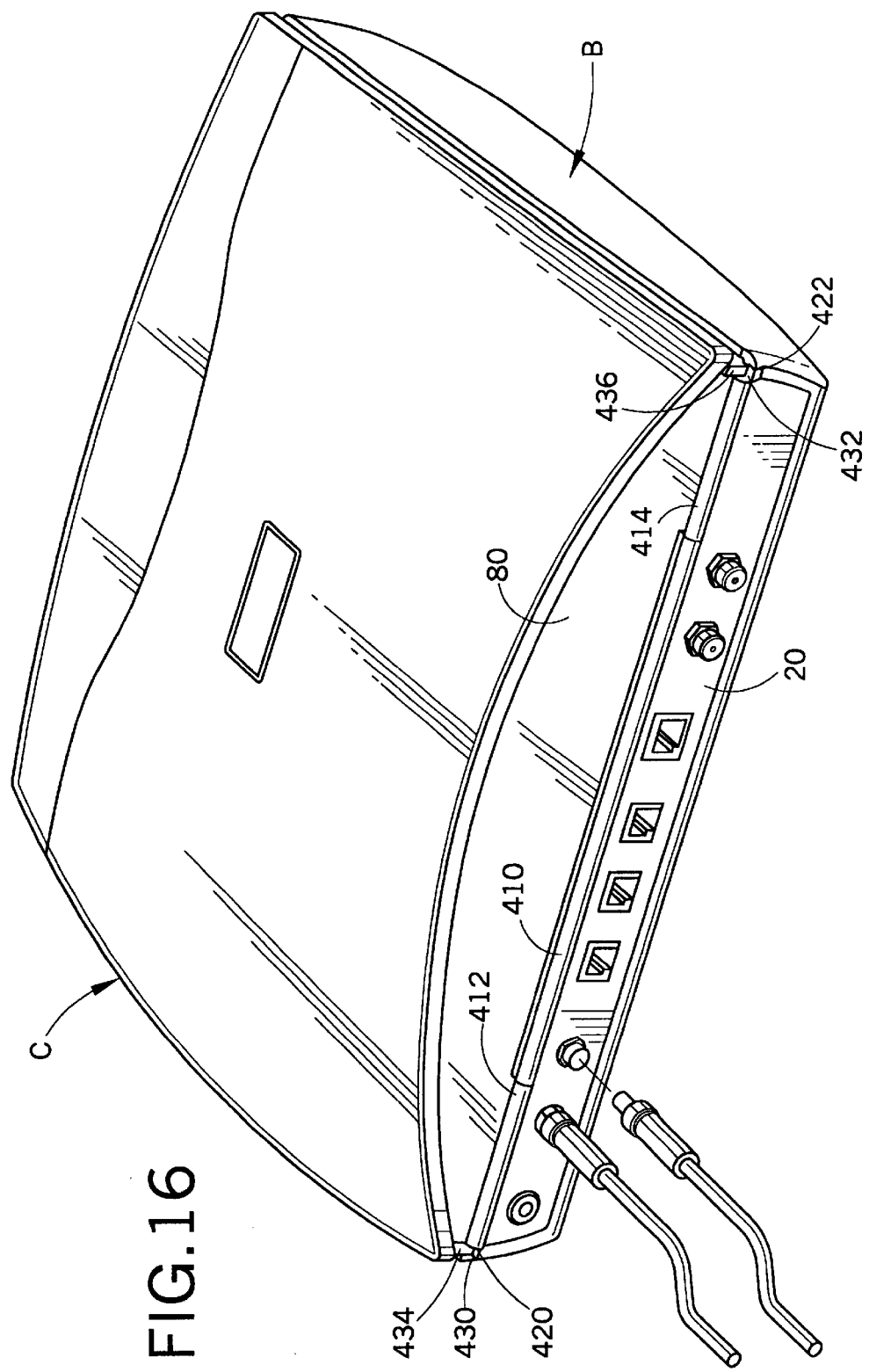
FIG. 16 is a rear perspective illustration showing the hinge between the housing case and door, along with abutments adjacent the hinge for supporting the door in a generally horizontal position when it is open.

FIG. 16 shows bottom wall 80 of door C having a hinge member 410 received between a pair of hinge members 412, 414 on bottom wall 20 of case B. Aligned holes in hinge members 410, 412 and 414 received hinge pin 82 for providing rotation of door C about the axis of pin 82 relative to case B.

Stop projections 420, 422 are molded on backwall 20 of case B and project downwardly therefrom when case B is mounted vertically. Each stop projection 420, 422 has a stop surface 430, 432 for cooperation with a flat abutment surface 434, 436 on door C adjacent the hinge.

Figure 17:
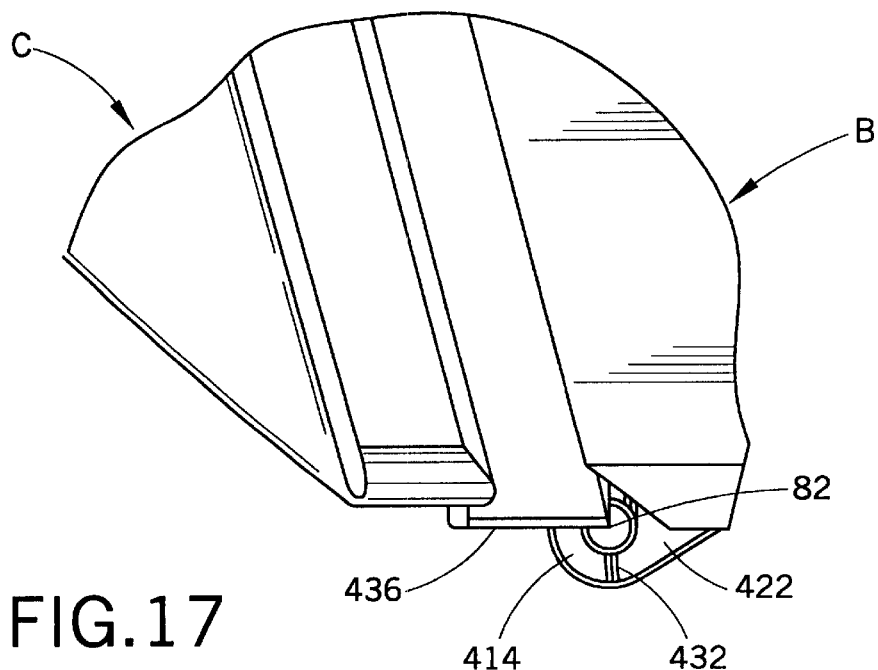
FIG. 17 is a partial side elevational view of the door in its vertical closed position and showing the abutment surfaces adjacent the hinge between the housing case and door for supporting the door in a generally horizontal position when it is open.
Figure 18:
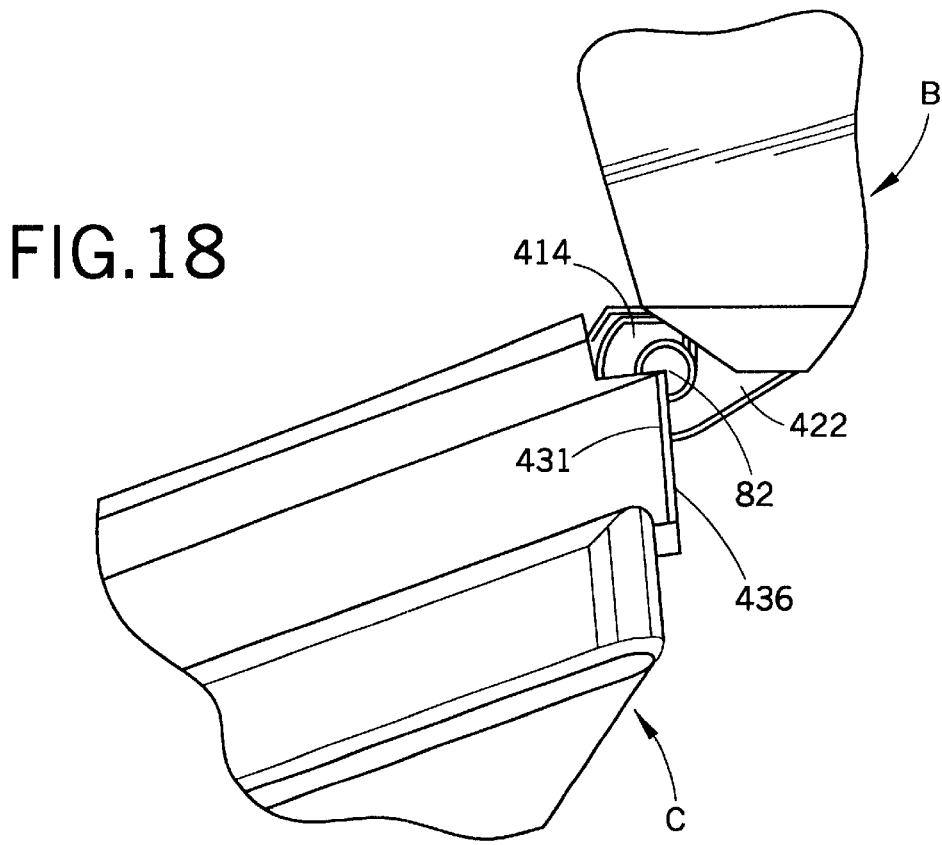
FIG. 18 is a view similar to FIG. 17 and showing the door in its generally horizontal position with the abutment surfaces in engagement.

As shown in FIG. 17, abutment surface 436 is generally horizontal when door C is in its vertical closed position, and stop surface 432 on stop projection 422 is located approximately 95° counterclockwise from abutment surface 436. When door C is opened to its generally horizontal position as shown in FIG. 18, door abutment surface 436 engages stop surface 432 to support door C in a generally horizontal position extending outwardly from case B. Door C actually rotates through an angle of approximately 95°, and is inclined downwardly to the horizontal approximately 5° in its open position. This provides a stable and convenient working area with easy access to the splice tray that is secured inside the door. Obviously, stop surface 430 and abutment surface 434 cooperate in the same manner as described with reference to stop surface 432 and abutment surface 436. As shown in FIGS. 17 and 18, abutment surfaces 434, 436 and stop surfaces 430, 432 lie in planes that intersect the longitudinal axis of hinge pin 82.

Splice tray E has a base 130 that is curved out of a flat plane to provide a better fit within the curved front wall 84 of door C. Therefore, all of the upright walls that form the fiber optic cable guideways do not extend perpendicular to the base. However, all of the guideway walls, except those on the guideway extension, extend approximately parallel to one another, and tray E is positionable approximately horizontally with all of the guideway walls and barrier walls extending generally vertically. In FIG. 11, tray E is positioned with the guideway walls extending vertically, and the angle 502 from a horizontal line 280 to the outer edge of guideway extension wall 180a is approximately 51.5°. When tray E is positioned generally horizontally with the guideway walls extending vertically as shown in FIG. 12, angle 504 from a vertical line 506 to the outer edge of guideway extension wall 180a is approximately 74.6°.

When words of degree are used in this application, such as about, approximately, generally or substantially, unless otherwise indicated or evident from the context in which they are used, the intended meaning is within 10% and most preferably within 5% of the condition or value that is modified by the word of degree.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A housing for fiber optic communications connections comprising: a housing case and a housing door, said housing case being securable to a vertical surface and having a case bottom portion to which said door is hinged for swinging movement about a horizontal hinge axis between a vertical closed position and a horizontal open position, said door having a door inner surface, a splice tray attached to said door inner surface, said splice tray having a fiber optic cable guideway that guides a fiber optic cable past said horizontal hinge axis from said case to said door, and said tray having a splicing area for splicing fiber optic cables.

2. The housing of claim 1 wherein said door in said horizontal position thereof has a door bottom wall that slopes downwardly from said horizontal hinge axis, and said splice tray having a guideway that extends along said bottom wall in a direction from said door inner surface upwardly toward said horizontal hinge axis.

3. The housing of claim 2 wherein said door bottom wall slopes downwardly at an angle of 40–60°.

4. The housing of claim 2 wherein said guideway extension has intersects said horizontal hinge axis at an angle of 20–40°.

5. The housing of claim 1 wherein said splice tray includes a tray base and a tray outer periphery, a plurality of holes in said base adjacent to and spaced along said outer periphery, and said door having a plurality of bosses projecting upwardly therefrom and being received in said holes for securing said splice tray to said door.

6. The housing of claim 1 wherein said splice tray has an outer periphery and said fiber optic cable guideway includes a curved main guideway adjacent to and extending along a portion of said outer periphery, said main guideway having a forked end that divides into a pair of first and second continuation guideways, said first continuation guideway extending in a direction inwardly away from said outer periphery to intersect said splicing area from a first direction, said second continuation guideway continuing in a curved path adjacent to and along another portion of said outer periphery to intersect said splicing area from a second direction that is different from said first direction.

7. The housing of claim 6 including a cable looping device in said splicing area around which fiber optic cables may be looped.

8. The housing of claim 1 wherein said splice tray has a tray outer periphery, and a cover hinged to said splice tray adjacent to said outer periphery for covering said splicing area.

9. A splice tray for use in splicing fiber optic cables comprising: a tray base having an outer periphery and a splicing area inwardly of said outer periphery, a fiber optic cable guideway extending along said base adjacent said outer periphery and intersecting said splicing area, said guideway having a guideway outer wall and a plurality of spaced-apart guideway inner wall segments, said fiber optic cable guideway including a curved portion and at least one of said plurality of guideway inner wall segments extending along said curved portion, said guideway inner wall segments being spaced inwardly from said guideway outer wall to form cable receiving channels therebetween, said guideway inner wall segments having spaces at opposite ends thereof along said guideway for accommodating a person's fingers to facilitate pushing a fiber optic cable into said cable receiving channels for retaining the cable therein and providing strain relief.

10. A splice tray for use in splicing fiber optic cables comprising: a tray base having an outer periphery and a splicing area inwardly of said outer periphery, a curved main guideway adjacent to and extending along a portion of said outer periphery, said main guideway having a forked end that divides into a pair of first and second continuation guideways, said first continuation guideway extending in a direction inwardly of said outer periphery to intersect said splicing area from a first direction, said second continuation guideway continuing in a curved path adjacent to and along another portion of said outer periphery to intersect said splicing area from a second direction that is different from said first direction, and a main guideway extension projecting from said outer periphery of said base.

11. The splice tray of claim 10 wherein said extension projects upwardly and outwardly from said base.

12. The splice tray of claim 10 wherein said extension projects upwardly and outwardly from said base at an angle of 40–60° to a horizontal plane.

13. The splice tray of claim 10 wherein said extension is inclined upwardly from said base in a direction along said outer periphery.

14. The splice tray of claim 10 wherein said extension is inclined upwardly from said base in a direction along said outer periphery at an angle of 20–40° to a horizontal plane.

15. The splice tray of claim 14 wherein said extension is inclined upwardly and outwardly from said base in a direction away from said outer periphery at an angle of 40–60° to a horizontal plane.

16. A splice tray for use in splicing fiber optic cables comprising: a tray base having an outer periphery and a splicing area inwardly of said outer periphery, a curved main guideway adjacent to and extending along a portion of said outer periphery, said main guideway having a forked end that divides into a pair of first and second continuation guideways, said first continuation guideway extending in a direction inwardly of said outer periphery to intersect said splicing area from a first direction, said second continuation guideway continuing in a curved path adjacent to and along another portion of said outer periphery to intersect said splicing area from a second direction that is different from said first direction, and a cover hinged to said base adjacent said outer periphery thereof for covering said splicing area.

17. A splice tray for use in splicing fiber optic cables comprising: a tray base having an outer periphery and a splicing area inwardly of said outer periphery, a curved main guideway adjacent to and extending along a portion of said outer periphery, said main guideway having a forked end that divides into a pair of first and second continuation guideways, said first continuation guideway extending in a direction inwardly of said outer periphery to intersect said splicing area from a first direction, said second continuation guideway continuing in a curved path adjacent to and along another portion of said outer periphery to intersect said splicing area from a second direction that is different from said first direction, and said base including a plurality of boss receiving holes spaced-apart along and adjacent to said outer periphery.

18. A splice tray for use in splicing fiber optic cables comprising: a tray base having an outer periphery and a splicing area inwardly of said outer periphery, a curved main guideway adjacent to and extending along a portion of said outer periphery, said main guideway having a forked end that divides into a pair of first and second continuation guideways, said first continuation guideway extending in a direction inwardly of said outer periphery to intersect said splicing area from a first direction, said second continuation guideway continuing in a curved path adjacent to and along another portion of said outer periphery to intersect said splicing area from a second direction that is different from said first direction, said guideways having guideway bottoms, and a plurality of spaced-apart cable retaining tabs spaced above and overlying said guideway bottoms.

19. A splice tray for use in splicing fiber optic cables comprising: a tray base having an outer periphery and a splicing area inwardly of said outer periphery, a curved main guideway adjacent to and extending along a portion of said outer periphery, said main guideway having a forked end that divides into a pair of first and second continuation guideways, said first continuation guideway extending in a direction inwardly of said outer periphery to intersect said splicing area from a first direction, said second continuation guideway continuing in a curved path adjacent to and along another portion of said outer periphery to intersect said splicing area from a second direction that is different from said first direction, a housing having a case and a door, said case being securable to a vertical surface and having a case bottom portion to which said door is hinged for swinging movement about a horizontal hinge axis between a vertical closed position and a horizontal open position, said door having a door inner surface, and said splice tray being attached to said door inner surface.

20. The splice tray of claim 19 wherein said door in said horizontal open position thereof has a door bottom wall inclined downwardly from said horizontal hinge axis at an angle of 40–60°, and said splice tray includes a main guideway extension projecting therefrom and extending along said door bottom wall.

21. The splice tray of claim 19 wherein said main guideway extension has an extension axis that intersects said horizontal hinge axis at an angle of 20–40°.

* * * * *